United States Patent [19]

Suzuki

[11] Patent Number: 5,787,122
[45] Date of Patent: Jul. 28, 1998

[54] METHOD AND APPARATUS FOR TRANSMITTING/RECEIVING, ENCODED DATA AS BURST SIGNALS USING A NUMBER OF ANTENNAS

[75] Inventor: Mitsuhiro Suzuki, Chiba, Japan

[73] Assignee: Sony Corporation, Tokyo, Japan

[21] Appl. No.: 640,059

[22] Filed: Apr. 30, 1996

[30] Foreign Application Priority Data

May 24, 1995 [JP] Japan ................... 7-125375

[51] Int. Cl.$^6$ ............................. H04B 7/02
[52] U.S. Cl. ................ 375/267; 375/299; 375/347; 455/101; 455/277.1
[58] Field of Search ............... 375/200, 203, 375/205, 267, 299, 347; 455/19, 78, 82, 101, 133, 272, 277.1; 370/278, 282, 321, 334, 337, 339, 347

[56] References Cited

U.S. PATENT DOCUMENTS

| | | | |
|---|---|---|---|
| 5,305,353 | 4/1994 | Weerackody | 375/267 |
| 5,479,448 | 12/1995 | Seshadri | 375/267 |
| 5,577,265 | 11/1996 | Wheatley, III | 455/33.3 |

*Primary Examiner*—Don N. Vo
*Assistant Examiner*—Amanda T. Le
*Attorney, Agent, or Firm*—Jay H. Maioli

[57] ABSTRACT

A simplified transmission-system and reception-system including a radio transmitter and radio receiver. A radio transmitter includes an encoding portion (22) for generating an encoded bit signal from transmission bit data, an interleave means (23) for interleaving an encoded output over a plurality of burst signals, a modulator (24) for modulating interleaved burst signals, and an antenna switcher (26) for switching modulated signals for each of the burst signals, and transmitting a switched modulated signal from a plurality of antennas (27a) (27n). A radio receiver includes a switch (72) for sequentially selecting reception signals received at a plurality of antennas (71a) (71m) for each of the burst signals, a demodulator (74) for demodulating a received signal of a selected antenna, a deinterleave portion (75) for deinterleaving a demodulated signal over a plurality of burst signals, and a decoding means (76) for generating an output signal for estimating transmission information by synthesizing signals dispersed into a plurality of symbols.

10 Claims, 11 Drawing Sheets

METHOD AND APPARATUS FOR TRANSMITTING/RECEIVING, ENCODED DATA AS BURST SIGNALS USING A NUMBER OF ANTENNAS

BACKGROUND OF THE INVENTION

The present invention relates to a transmitter for transmitting a burst signal and a transmission method thereof, a receiver for receiving a burst signal and a reception method thereof, and a transfer method of transmitting and receiving a burst signal.

FIG. 1 of the accompanying drawings shows a typical radio communication system.

As shown in FIG. 1, transmission data applied to a transmission signal input terminal 1 is supplied to and modulated by a modulator 2. A modulated signal from the modulator 2 is amplified by a transmission amplifier 3, and a transmission signal thus amplified by the transmission amplifier 3 is transmitted from an antenna 4 via radio waves. Then, a transmission signal transmitted through a predetermined propagation path 5 is received at an antenna 6 on the reception side, and supplied through a reception amplifier 7 to a demodulator 8, in which it is demodulated. Reception data thus demodulated by the demodulator 8 is developed at a reception signal output terminal 9.

In this case, P assumes a transmission power from the antenna 4, L assumes an average loss of signal level of a signal transmitted through the propagation path 5, and f assumes variations of signal level of received signal due to fading which is a change in the state of the propagation path. Then, a reception power is expressed by $|f|^2 LP$. In a typical probability distribution of signal level of received signal, an average signal level of received signal is represented by $\sqrt{LP}$. FIG. 2 is a characteristic graph of a probability distribution showing measured results of signal level of received signal versus probability density obtained when signal level was changed due to fading. In FIG. 2, the horizontal axis represents the amplitude of received signal, and the vertical axis represents the probability density. In FIG. 2, an area X shown cross-hatched indicates an area in which signal level of received signal is less than a predetermined signal level (i.e., amplitude of received signal is less than predetermined value). In this area X, an S/N (signal-to-noise ratio) of received signal is not sufficiently high so that it becomes difficult to accurately demodulate received data, causing bit errors to occur frequently. FIG. 3 on the other hand is a characteristic graph of a probability distribution showing measured results of signal level of received signal versus probability density obtained when there was no fading. Also in FIG. 3, the horizontal axis represents the amplitude of received signal, and the vertical axis represents the probability density. As shown in FIG. 3, the distribution of signal level of received signal is concentrated near the average level $\sqrt{LP}$, and there is no such area X in which bit errors are caused to occur frequently.

When radio signals are transmitted in actual practice, a transmission side and a reception side do not always remain still but they are usually moving as they are frequently observed in a radio communication system like a portable radiotelephone or a mobile radiotelephone. When such transmitter or receiver is in use, most of signals are received under the condition that the signal level of received signals are changed due to fading as shown in FIG. 2.

Therefore, in order to eliminate the above area X where much more bit errors are caused to occur, it is requested to increase an S/N of received signal by increasing the transmission power P even when the reception condition is relatively poor. However, if the transmission power P were increased so high, the transmission amplifier 2 would be operated very hard to amplify the modulated signal from the modulator 2 to a satisfactorily high level.

A method of improving a transmission state under the condition that the signal level of received signal is changed due to fading is not limited to the above-mentioned method which increases the transmission power but instead, there has heretofore been developed a transmission system using an antenna system which will hereinafter be referred to as a "distribute antenna".

The distribute antenna can be applied to both the transmission side and the reception side. FIG. 4 shows, in block form, a manner in which the distribute antenna is applied to the transmission side.

As shown in FIG. 4, transmission data is applied to a transmission signal input terminal 1. Then, the transmission data is supplied from the input terminal 1 to a modulator 2, in which it is modulated, and supplied to a distributor 3, wherein it is distributed and outputted as N outputs (N is an arbitrary integer larger than "2"). The N distributed outputs from the distributor 11 are supplied to delay circuits 12a, 12b, ..., 12n. In this case, $\tau_0, \tau_1, ..., \tau_{N-1}$ assume delay times of the delay circuits 12a, 12b, ..., 12n, respectively. Then, these delay times $\tau_0, \tau_1, ..., \tau_{N-1}$ are sequentially progressively extended and become different from each another. After the outputs from the delay circuits 12a, 12b, ..., 12n have been supplied to and amplified by transmission amplifiers 13a, 13b, ..., 13n, amplified outputs from the transmission amplifiers 13a, 13b, ..., 13n are supplied to transmission antennas 14a, 14b, ..., 14n, and thereby transmitted from the transmission antennas 14a, 14b, ..., 14n via radio waves. At that time, transmission powers from the transmission antennas 14a, 14b, ..., 14n may be P/N where P is the necessary transmission power.

Signals transmitted from the transmission antennas 14a through 14n are received at an antenna 6, and demodulated by a demodulator 8. In this case, the demodulator 8 demodulates the signals based on a demodulation system which is able to prevent a transmission characteristic from being deteriorated by an influence of delayed waves. The transmission signals are previously processed by a suitable means, such as an equalizer, and then demodulated by the demodulator 8.

When the transmission signal is transmitted as described above, an average attenuation of the signals transmitted from the antennas 14a, 14b, ..., 14n is at low level, and variations of signal level due to independent fadings $f_0, f_1, ..., f_{N-1}$ are caused to occur among the transmission antennas 14a, 14b, ..., 14n and the reception antenna 6. At that time, a power of reception signals on the reception side becomes a sum of the transmission signals as shown by the following equation (1):

$$\sum_{k=0}^{N-1} f_k^2 LP/N \qquad (1)$$

A signal synthesized on the reception side is a sum of random levels. A fluctuation of integrated reception level is reduced, and its probability distribution falls in the state shown in FIG. 5. Although this state is a little inferior to the state with no fadings therein, the probability distribution is concentrated near the average level $\sqrt{LP}$ and there is substantially no such area X' in which bit errors are caused to occur frequently. A probability shown by a broken line in FIG. 5 shows the state obtained when the distribute antenna is not applied to the transmission side.

While the example in which the distribute antenna is applied to the transmission antenna has been described so far, the distribute antenna can be applied to a reception antenna with similar improvements of its characteristics being achieved, and the characteristics shown in FIG. 5 can be obtained. FIG. 6 shows an example in which the distribute antenna is applied to the reception antenna. The arrangement of the transmission system thereof is the same as that shown in FIG. 1. As shown in FIG. 6, a signal transmitted from the transmission antenna 4 is received at M (M is an arbitrary integer larger than "2") antennas 15a, 15b, ...., 15m. Signals received at the antennas 15a, 15b, ...., 15m are amplified by reception amplifiers 16a, 16b, ...., 16m, delayed by delay circuits 17a, 17b, ...., 17m, and synthesized to a signal of one system by an adder 18.

In this case, $\tau_0, \tau_1, \ldots, \tau_{m-1}$ assume delay times of the delay circuits 17a, 17b, ...., 17m. Then, the delay times $\tau_0, \tau_1, \ldots, \tau_{m-1}$ are sequentially extended a little, and become different from each other. A reception signal synthesized by an adder 18 is supplied to and demodulated by a demodulator 8, and demodulated reception data is outputted from an output terminal 9.

With the above-mentioned arrangement, similarly to the case that the distribute antenna is applied to the transmission antennas, level fluctuations due to independent fadings $f_0, f_1, \ldots, f_{M-1}$ are generated among the transmission antenna 4 and the reception antennas 15a, 15b, ...., 15m, and hence there can be obtained the satisfactory transmission characteristic shown in FIG. 5.

However, when the transfer system uses the distribute antenna, the transmission system or the reception system becomes complicated in arrangement. Specifically, when the distribute antenna is applied to the transmission system as shown in FIG. 4, for example, there are required the distributor 11, a plurality of delay circuits 12a, 12b, ...., 12n, and a plurality of amplifiers 13a, 13b, ...., 13n. As a consequence, as compared with the transmission system using only one antenna shown in FIG. 1, this transmission system becomes complicated in arrangement. In particular, the delay circuit for delaying a transmission high frequency signal is large in size and expensive. Therefore, it should preferably be avoided that the transmission circuit includes a plurality of large and expensive delay circuits.

If a signal amplified by a transmission amplifier is distributed, delayed and supplied to different antennas, then it becomes sufficient to use only one transmission amplifier. In this case, the signal including a loss of the distributor and a plurality of delay circuits has to be amplified by one transmission amplifier, and hence the transmission amplifier suffers from a large burden imposed thereon.

Further, when the distribute antenna is applied to the reception system as shown in FIG. 6, such reception system needs the reception amplifier, a plurality of delay circuits whose number is corresponding to the number of antennas, and the adder. Thus, the reception circuit becomes complicated and expensive similar to the case that the distribute antenna is applied to the transmission system.

Furthermore, as a simplified reception system in which the reception signals are added by the adder and amplified by the reception amplifier, it is proposed to use only one reception amplifier. In that case, however, the reception signal is delayed and then amplified by the reception amplifier so that the S/N of the reception signal is deteriorated by a degree corresponding to the loss in the delay circuit.

SUMMARY OF THE INVENTION

In view of the aforesaid aspect, it is an object of the present invention to provide a transmitter, a receiver, a transmission method, a reception method, and a transfer method in which, when a transmission characteristic is improved by adaptation of a principle of a distribute antenna, a signal can be transmitted by a simplified transmission system and reception system.

According to a first aspect of the present invention, there is provided a radio transmitter for intermittently transmitting an encoded information signal in the form of a burst signal. This radio transmitter is comprised of an encoder for generating an encoded bit signal by encoding bit data of transmission information, an interleave circuit for interleaving an output signal from the encoder over a plurality of burst signals, a modulator for modulating an output signal from the interleave circuit, a plurality of antennas, and a switch for sequentially selectively supplying an output signal of the modulator to the antennas for each of the burst signals.

According to a second aspect of the present invention, there is provided a radio receiver for receiving a signal transmitted from a transmitter including an encoder for generating an encoded bit signal by encoding bit data of transmission information, an interleave circuit for interleaving an output signal from the encoder over a plurality of burst signals, a modulator for modulating an output signal from the interleave circuit, and a switch for sequentially selectively supplying an output signal from the modulator to a plurality of antennas for each of the burst signals. This radio receiver is comprised of a plurality of antennas, a switch for sequentially selecting reception signals received at the antennas for each of the burst signals, a demodulator for demodulating an output signal of the switch, a deinterleave circuit for deinterleaving an output signal of the demodulator over the burst signals, and a decoding circuit for generating an output signal for estimating the transmission information by decoding the encoded bit signal in each of the burst signals deinterleaved by the deinterleave circuit.

According to a third aspect of the present invention, there is provided a radio transmission method of intermittently transmitting an encoded information signal in the form of a burst signal. This radio transmission method is comprised of the steps of generating an encoded bit signal by encoding bit data of transmission information, interleaving the encoded bit signal over a plurality of burst signals, modulating an interleaved signal, and transmitting a modulated signal by sequentially selectively supplying a modulated signal to a plurality of antennas for each of the burst signals.

In accordance with a fourth aspect of the present invention, there is provided a radio reception method for receiving a signal transmitted by a radio transmission method comprising the steps of generating an encoded bit signal by encoding bit data of transmission information, interleaving the encoded bit signal over a plurality of burst signals, modulating the interleaved signal, and transmitting a transmission signal by sequentially selectively supplying the modulated signal to a plurality of antennas for each of the burst signals. This radio reception method comprising the steps of sequentially selecting reception signals received at a plurality of antennas for each of the burst signals, demodulating a selected signal, deinterleaving a demodulated signal over a plurality of burst signals, and generating an output signal for estimating transmission information by decoding the encoded bit signal in the deinterleaved burst signals.

In accordance with a fifth aspect of the present invention, there is provided a radio transmission-reception method which is comprised of the steps of generating an encoded bit signal by encoding bit data of transmission information, interleaving the encoded bit signal over a plurality of burst signals, modulating the interleaved signal, transmitting a transmission signal by sequentially selectively supplying the modulated signal to a plurality of antennas for each of the burst signals, receiving the transmission signal at a plurality of antennas, sequentially selecting reception signals received at a plurality of antennas for each of the burst signals, demodulating the selected signal, deinterleaving the demodulated signal over the burst signals, and generating an output signal for estimating transmission information by decoding the encoded bit signal in the deinterleaved burst signals.

In accordance with a sixth aspect of the present invention, there is provided a radio transmitter-receiver which is comprised of a plurality of antennas, a first switch including a plurality of first terminals respectively connected to the antennas, second terminals connected to the first terminals upon transmission, and third terminals connected to the first terminals upon reception, an encoding circuit for generating an encoded bit signal by encoding bit data of transmission information, an interleave circuit for interleaving an output signal from the encoding circuit over a plurality of burst signals, a modulating circuit for receiving an output signal from the interleave circuit, a second switch for sequentially selectively providing an output signal from the modulating circuit to the second terminals, a plurality of demodulating circuits for respectively demodulating signals provided from the third terminals of the first switch, a synthesizing circuit for selecting and outputting a best signal from outputted signals of the demodulating circuits, a deinterleave circuit for deinterleaving an output signal from the synthesizing circuit over the burst signals, and a decoding circuit for generating an output signal for estimating transmission information by decoding the encoded bit signal of the deinterleaved burst signals.

DETAILED DESCRIPTION OF THE PREFERRED EMBODIMENT

The present invention will now be described with reference to FIGS. 7A to 7C through FIG. 12.

In this embodiment, the present invention is applied to a communication system which is generally referred to as a TDMA (time division multiple access) system in which burst data ia transmitted intermittently. Initially, a communication state will be described with reference to FIGS. 7A to 7C.

Figure 7:
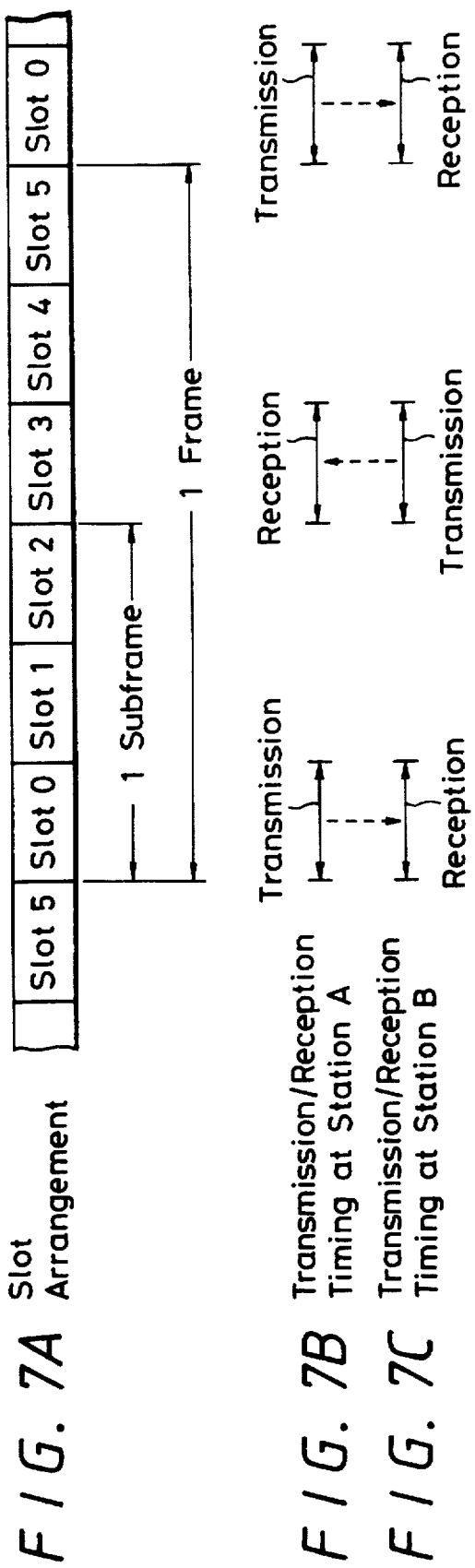
FIG. 7A is a schematic diagram showing a slot arrangement.
FIG. 7B is a schematic diagram showing transmission/reception timing at station A.
FIG. 7C is a schematic diagram showing transmission/reception timing at station B.

FIG. 7A shows a slot arrangement. In this embodiment, in a certain transmission channel, one frame is defined at every predetermined time, and one frame comprises two subframes. One frame is divided into six slots, and these six slots are sequentially numbered as slot 0, slot 1, slot 2, slot 3, slot 4, and slot 5. When each transmitter transmits data, burst data corresponding to each slot period is transmitted.

When transmission/reception is carried out between a station A and a station B, transmission/reception timing at the station A falls in the state shown in FIG. 7B, and transmission/reception timing at the station B falls in the state shown in FIG. 7C. Specifically, during the slot 0 of each frame, one burst data is transmitted from the station A, and the station B receives such transmitted one burst data during the same period of the slot 0. During the period of the slot 3, one burst data is transmitted from the station B, and the station A receives such transmitted one burst data during the same period of the slot 3.

In this manner, the stations A and B transmit and receive data therebetween by use of the slots 0 and 3 of each frame. Then, the stations A and B are able to transmit and receive burst data between another transmitter and receiver by use of slots 1 and 4 which are not in use. Further, the stations A and B are able to transmit and receive burst data between another transmitter and receiver by use of slots 2 and 5 which are not in use. Accordingly, when one frame comprises six slots, data can be simultaneously transmitted and received between three sets of transmitters and receivers, at maximum, through one transmission channel.

While one frame comprises six slots as described above, the number of slots comprising one frame is not limited to six and may be changed. When one frame comprises two slots, for example, data is transmitted and received between a transmitter and receiver through one transmission channel. When one frame comprises eight slots or more, data can be simultaneously transmitted and received between four or more sets of transmitters and receivers.

If burst data is transmitted according to the TDMA system as described above, then data can be efficiently transmitted through one transmission channel.

In the burst data transmitted according to the TDMA system, sync (synchronizing) data is provided within a predetermined interval of one burst data, for example, so that the reception side can accurately receive such burst data by detecting the sync data supplied thereto.

The present invention is applied to the transmission system for transmitting burst data. Initially, a manner in which the present invention is applied to the transmission system will be described with reference to FIG. 8.

Figure 8:
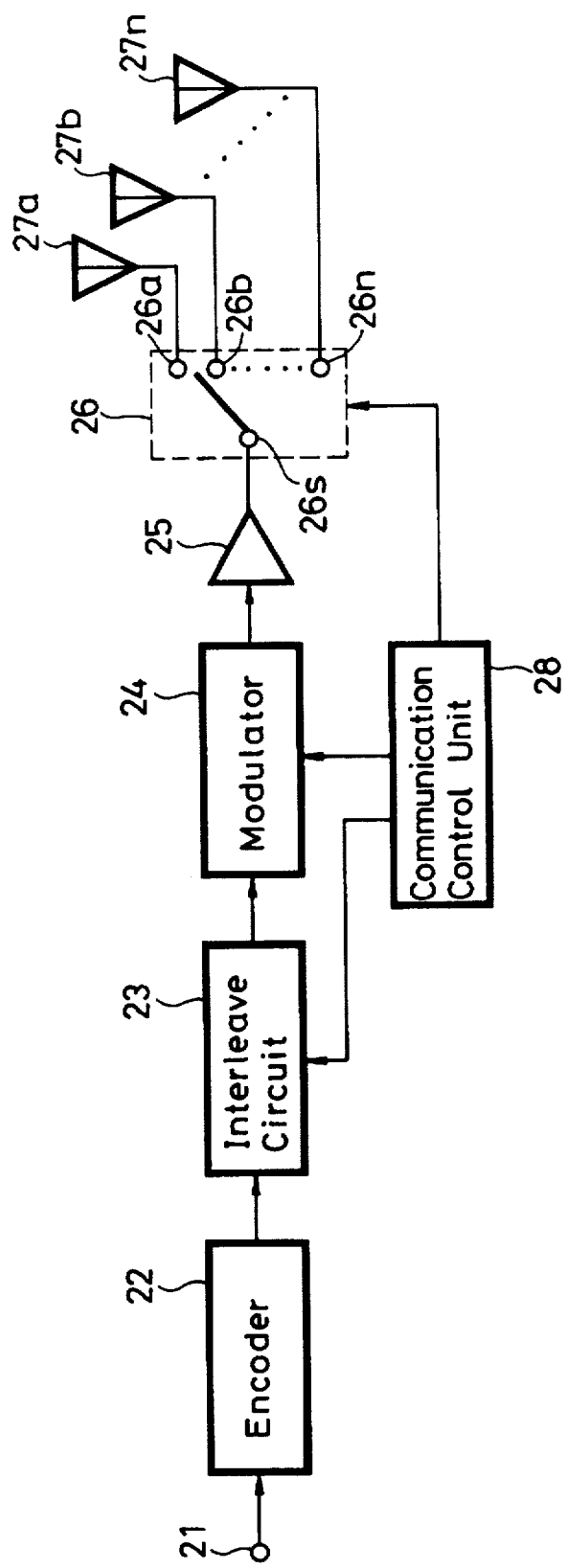
FIG. 8 is a schematic block diagram showing a transmission system to which the present invention is applied.

FIG. 8 shows, in block form, a transmission system to which the present invention is applied.

As shown in FIG. 8, transmission data applied to a transmission data input terminal 21 is supplied to and encoded by an encoder 22. The encode processing herein is based on an encode processing using convolutional code which will be described later on. Data encoded by the encoder 22 is supplied to and interleaved by an interleave circuit 23 under control of a communication control unit 28 which controls a transmission processing. By the interleaving, data is interleaved at the burst signal unit over a plurality of burst data.

Burst data outputted from the interleave circuit 23 is supplied to a modulator 24, and thereby modulated in accordance with a predetermined modulation system (e.g., phase-modulation such as QPSK (quadrature phase shift keying) modulation) as burst modulated data with a predetermined transmission channel. A timing at which the burst data is modulated by the modulator 24 is controlled by the communication control unit 28. The signal modulated by the modulator 24 is amplified by a transmission amplifier 25, and supplied to a movable contact 26s of an antenna switcher 26.

The antenna switcher 26 includes fixed contacts 26a, 26b, ..., 26n (n is an arbitrary integer larger than "2") with different antennas 27a, 27b, ..., 27n connected thereto. The antenna switcher 26 switches the movable contact 26s under control of the communication control unit 28, and selects a different antenna each time one burst transmission data is outputted from the transmission amplifier 25. Thus, transmission data is transmitted from a different antenna at the unit of one burst data via radio waves. In this case, the antennas 27a through 27n may be selected in the previously-determined sequential order or may be randomly selected based on data (e.g., M-series data, etc.) generated at random. When the antennas 27a, 27b, ..., 27n are selected randomly, the antennas may be selected equally under control of the communication control unit 28.

The encoder 22 shown in FIG. 8 will be described more fully below. The encoder 22 according to this invention is of the convolutional code encoder type, and FIG. 9 shows, in block form, an example of such convolutional code encoder wherein a convolutional code k is 7 and a coding rate R is 1/3.

Figure 9:
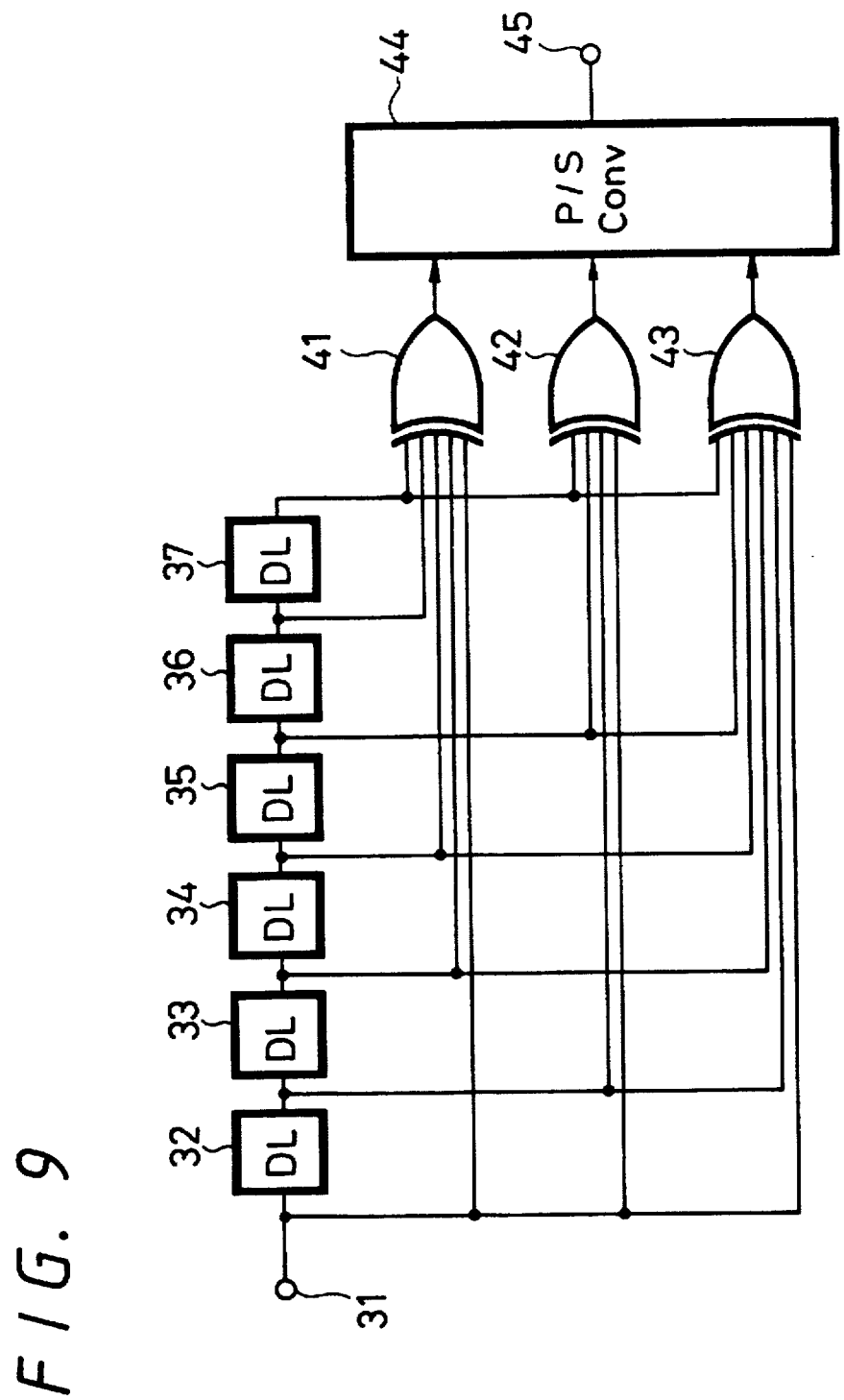
FIG. 9 is a schematic block diagram showing an example of a convolutional code encoder.

As shown in FIG. 9, bit data applied to an input terminal 31 is supplied to delay circuits (DL) 32, 33, 34, 35, 36, 37 connected in series. The bit data supplied to the input terminal 31 and outputs from the delay circuits 33, 34, 36, 37 are supplied to exclusive-OR gate 41 which generates an exclusive-ORed output. The bit data supplied to the input terminal 31 and outputs from the delay circuits 32, 35, 37 are supplied to an exclusive-OR gate 42 which generates an exclusive-ORed output. Further, the bit data supplied to the input terminal 31 and outputs of the delay circuits 32, 33, 34, 35, 37 are supplied to an exclusive-OR gate 43 which generates an exclusive-ORed output.

The logical outputs from the exclusive-OR gates 41, 42, 43 are supplied to a parallel-to-serial (PS) converter 44, in which they are converted into serial data. The serial data thus converted by the P/S converter 44 is supplied to an output terminal 45.

According to the convolutional code encoder 22, one-bit data applied to the input terminal 31 affects the state of 15 symbols of the encoded data developed at the output terminal 45, i.e., one-bit data is dispersed into 15 symbols.

Figure 5:
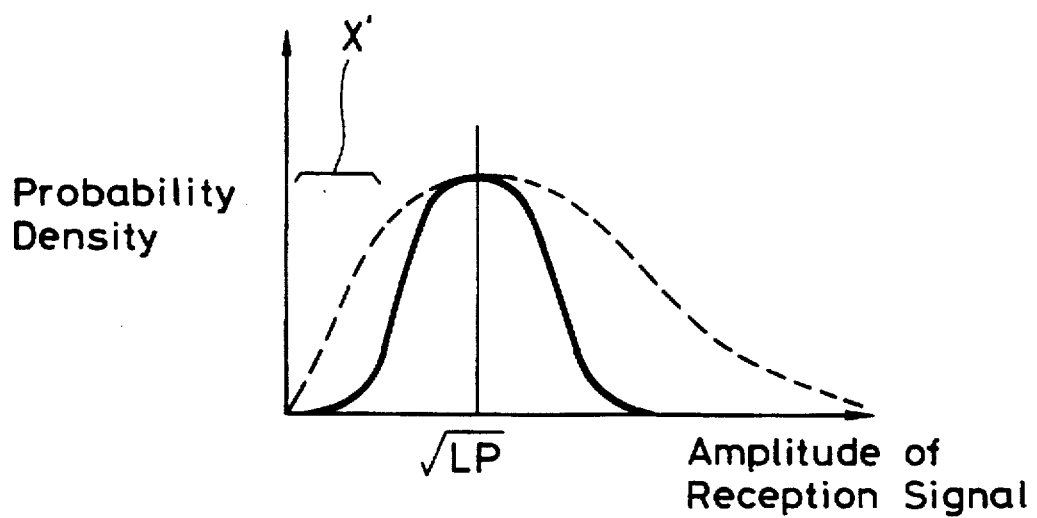
FIG. 5 is a characteristic graph showing a probability distribution of typical reception level obtained when the distribution antenna is applied to the transmission antennas as shown in FIG. 4.
Figure 6:
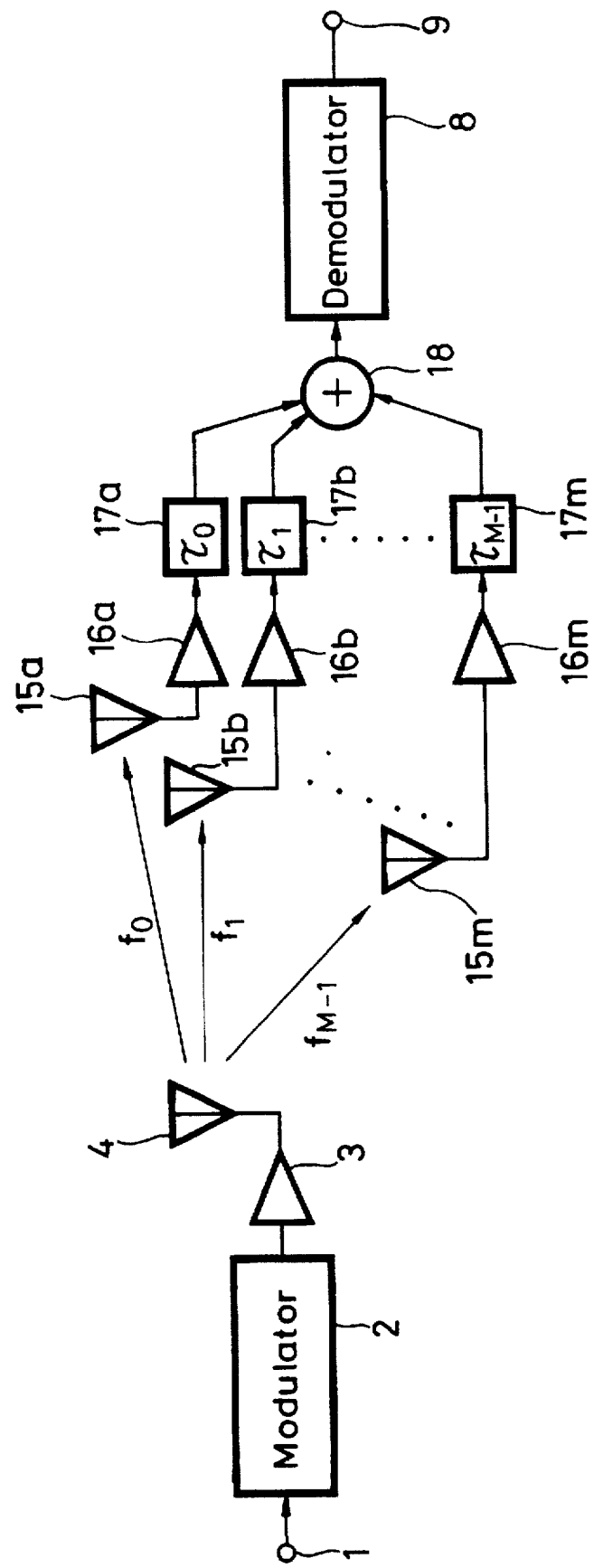
FIG. 6 is a schematic block diagram showing a transmission arrangement in which the distribute antenna is applied to reception antennas.

The data encoded by the convolutional code encoder is interleaved, modulated, switched in antenna and transmitted via radio waves according to the circuit arrangement shown in FIG. 8 with similar effects to those achieved when such data is transmitted by the distribute antenna. Specifically, when data is encoded by the convolutional code encoder 22, one-bit data is dispersed into a plurality of symbols, and a coded bit signal is generated. Also, data is interleaved over a plurality of burst data by the interleave circuit 23, and hence transmission bit data supplied to the input terminal 21 is dispersed into a plurality of burst data and then transmitted. According to this embodiment, since the transmission antenna is switched at the one burst data unit, transmission data are dispersed and transmitted from a plurality of antennas, thereby constructing the distribute antenna of the transmission side. Therefore, the reception side which receives such transmission signal can improve S/N of the reception signal as shown in FIG. 5.

Since the transmitted signal is only switched at the burst data unit by the antenna switcher, transmission data can be transmitted efficiently. Specifically, the transmission amplifier of only one system may be sufficient, and a loss generated when the transmission signal is distributed by the distributor may be avoided. Therefore, it is possible to obtain a satisfactory transmission output by only the transmission amplifier of one system. Furthermore, unlike the conventional distribute antenna, the delay circuits for delaying the high frequency signal need not be provided, and hence the transmission system can be simplified in arrangement.

On a reception side for receiving a signal transmitted by the arrangement shown in FIG. 8, if the distribute antenna is not provided, then the above transmitted signal may be received by a reception circuit similar to the conventional reception circuit. Specifically, a signal received at an antenna is amplified by a reception amplifier, and demodulated by a demodulator. A demodulated signal is deinterleaved so that the interleaved data is reconverted into original data. Reception data thus deinterleaved is supplied to and decoded by a decoder. In the decoding (e.g., Viterbi decoding), signals that have been dispersed into a plurality of symbols by the convolutional code encoding on the transmission side are synthesized, and transmission bit data is assumed, thereby obtaining reception data.

Figure 1:
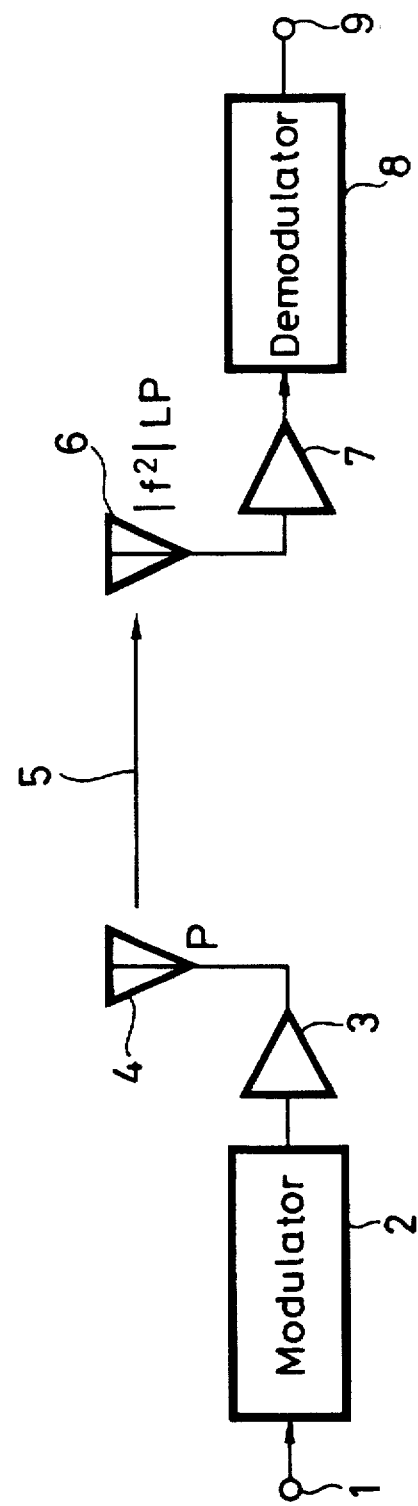
FIG. 1 is a schematic block diagram showing a typical radio communication system.
Figure 2:
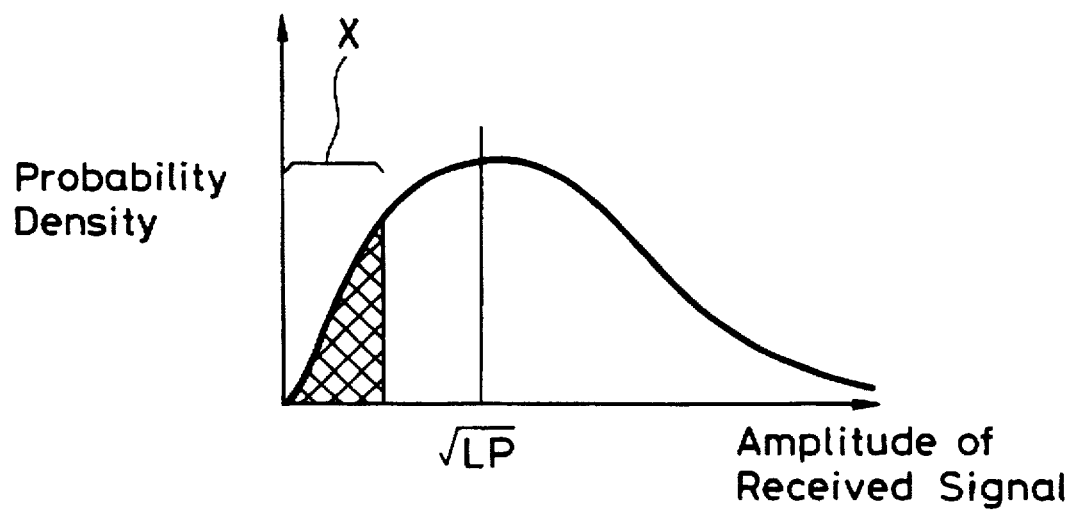
FIG. 2 is a characteristic graph showing a probability distribution of typical reception level obtained when a transmission path has fading.
Figure 3:
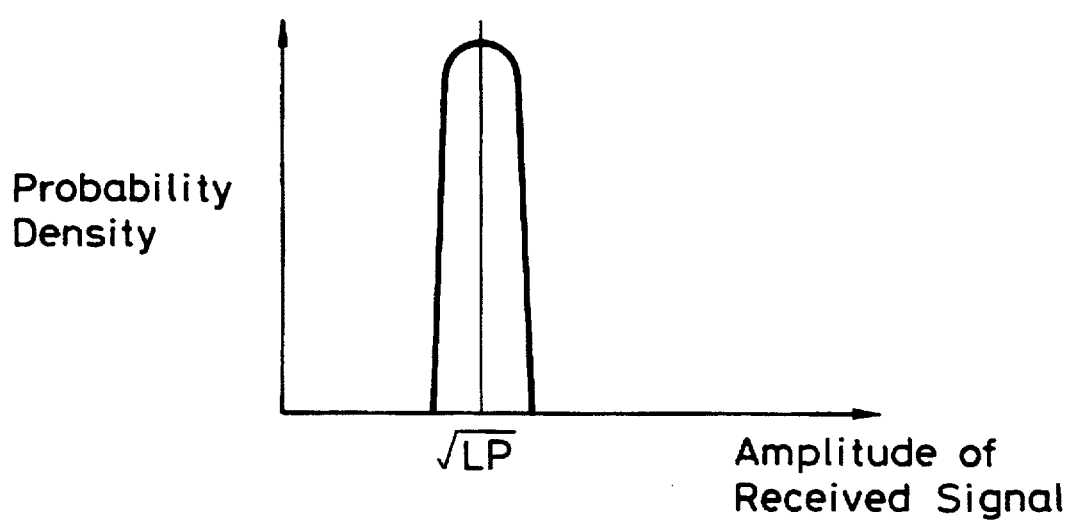
FIG. 3 is a characteristic graph showing a probability distribution of typical reception level obtained when a transmission path has no fading.
Figure 4:
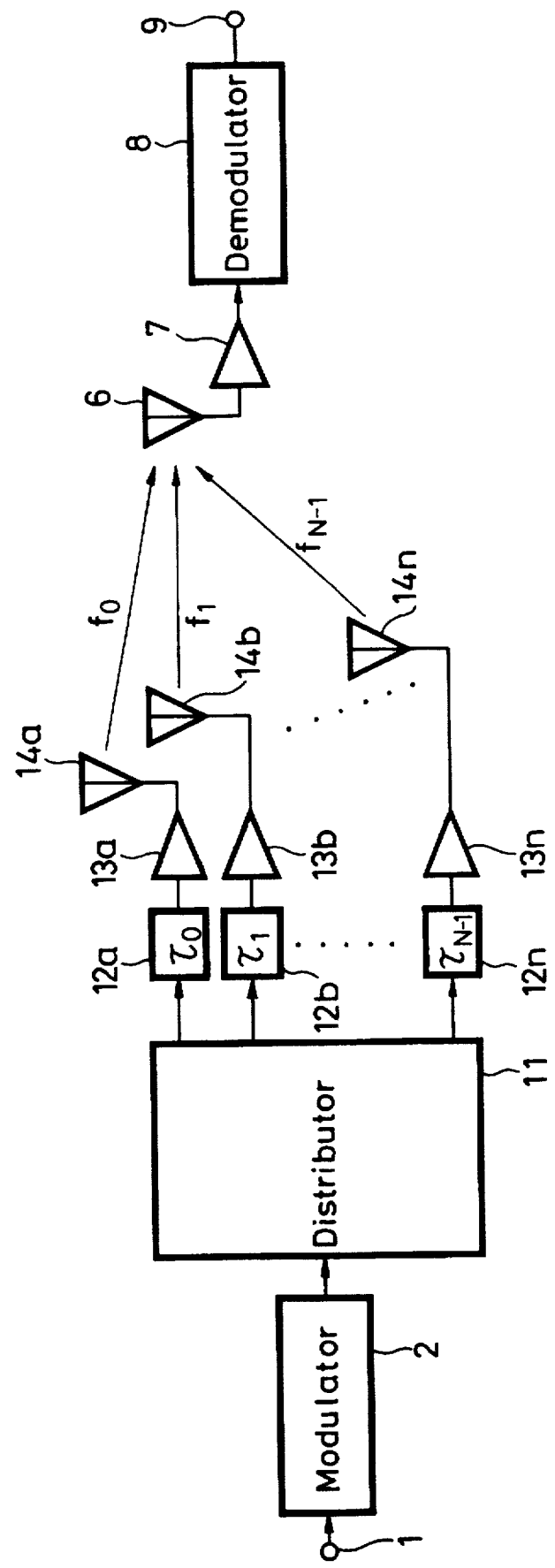
FIG. 4 is a schematic block diagram showing a transmission arrangement in which a distribute antenna is applied to transmission antennas.

However, unlike the conventional reception circuit for receiving a signal transmitted from the conventional distribute antenna arrangement transmission circuit (e.g., the transmission circuit shown in FIG. 4), the reception circuit according to the present invention is a reception circuit for receiving a signal directly delayed by the delay circuit. Thus, when a signal is demodulated by a demodulator, an influence of delayed waves need not be considered, and hence the demodulator can be simplified in arrangement.

With the application of the transmission circuit according to the present invention, reception performance can be improved without special processing on the reception circuit side. If the reception circuit side is formed as a distribute antenna type, then a reception performance can be further improved. Furthermore, other reception performance improvement processing such as diversity reception may be carried out.

Figure 10:
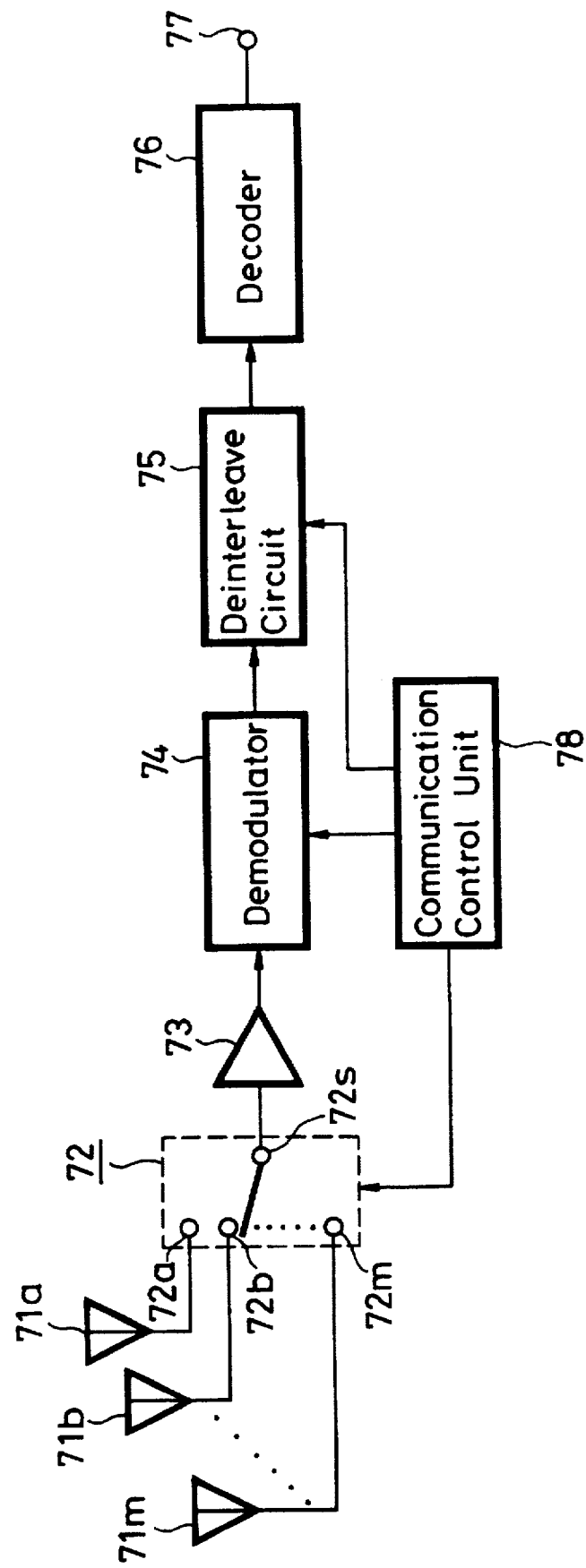
FIG. 10 is a schematic block diagram showing a reception circuit.

An example in which the transfer system according to the present invention is applied to the reception system will be described with reference to FIG. 10. A reception circuit shown in FIG. 10 is adapted to receive a signal which results from transmitting the signal processed by the transmission system from the encoder 22 to the transmission amplifier 25 shown in FIG. 8 by the antenna via radio waves. Specifically, the reception signal is a signal wherein a signal is encoded by the encoding in which one-bit data such as convolutional code is dispersed into a plurality of symbols, the output signal from the encoding means is interleaved over a plurality of burst data, the interleaved burst data is modulated and transmitted via radio waves. The reception circuit according to the present invention can receive a signal which is transmitted via radio waves after a plurality of antennas 27a through 27n are switched as shown in FIG. 8, and a signal transmitted from one antenna via radio waves.

As shown in FIG. 10, reception signals from a plurality of antennas 71a, 71b, . . . , 71m are supplied to fixed contacts 72a, 72b, . . . , 72m of an antenna switcher 72. The antenna switcher 72 switches a movable contact 72s under control of a communication control unit 78 which controls a reception control of this receiver. Each time the antenna switcher 72 receives burst data, the antenna switcher 72 switches the antenna under control of the communication control unit 78. The antennas 71a through 71m may be selected in the previously-determined sequential order or may be randomly selected based on data (e.g., M-series data) generated at random. However, when the antennas 71a through 71m are selected randomly, the antennas are selected equally under control of the communication control unit 78.

A reception signal obtained at the movable contact 72s is amplified by a reception amplifier 73, and supplied to and demodulated by a demodulator 74. A demodulated signal is supplied to and deinterleaved by a deinterleave circuit 75. The deinterleave circuit 75 deinterleaves data so that the interleaved data on the transmission side is reconverted into the original data. The deinterleaved reception data is supplied to and decoded by a decoder 76, and thereby decoded reception data is developed at an output terminal 77. The decoding may be a Viterbi decoding wherein the original bit data is assumed from the signal that has been dispersed into a plurality of symbols by the convolutional coding on the transmission side. The demodulator 74 demodulates the burst signal and the deinterleave circuit 75 deinterleaves the data under control of the communication control unit 78.

Since the reception signal is received as described above, it is possible to achieve similar effects to those achieved when the reception signal is received by the distribute antenna system. More specifically, the processing for switching the reception signal from a plurality of antennas at one burst data unit, the deinterleave processing for deinterleaving the switched signal over a plurality of burst data to provide data in the original order, and the processing for assuming transmission bit data by synthesizing dispersed and received signal from a plurality of antennas are executed. Thus, transmission bit data is decoded from signals dispersed and received at a plurality of antennas, and hence S/N of the received signal can be improved similarly to the distribute antenna on the reception side described in the conventional example.

Since the reception antennas are switched at the burst data unit by the antenna switcher, transmitted signal can be received efficiently. The transmission amplifier of one system is sufficient, and the signal need not be delayed by the delay circuits unlike the prior art. Therefore, the transmitted signal can be satisfactorily received by the reception circuit of simplified arrangement.

Unlike the conventional reception circuit with the distribute antenna arrangement, the reception circuit according to the present invention is not the reception circuit for receiving the signal which is directly delayed by the delay circuit. Thus, when the signal is demodulated by the demodulator, the influence of the delayed wave need not be considered, and the demodulator can be further simplified in arrangement.

Although the reception circuit according to the present invention may receive the signal transmitted from the single antenna or the signal transmitted from the distribute antenna on the transmission side shown in FIG. 8, if the transmission side is formed as the distribute antenna arrangement for switching the antennas, then a reception performance can be improved. In this case, if the number of the antennas on the transmission side and that of the antennas on the reception side are the same, then it can be expected that the reception performance is further improved by making the switching order of the antennas on the transmission side and the switching order of the antennas on the reception side become different from each other.

Figure 11:
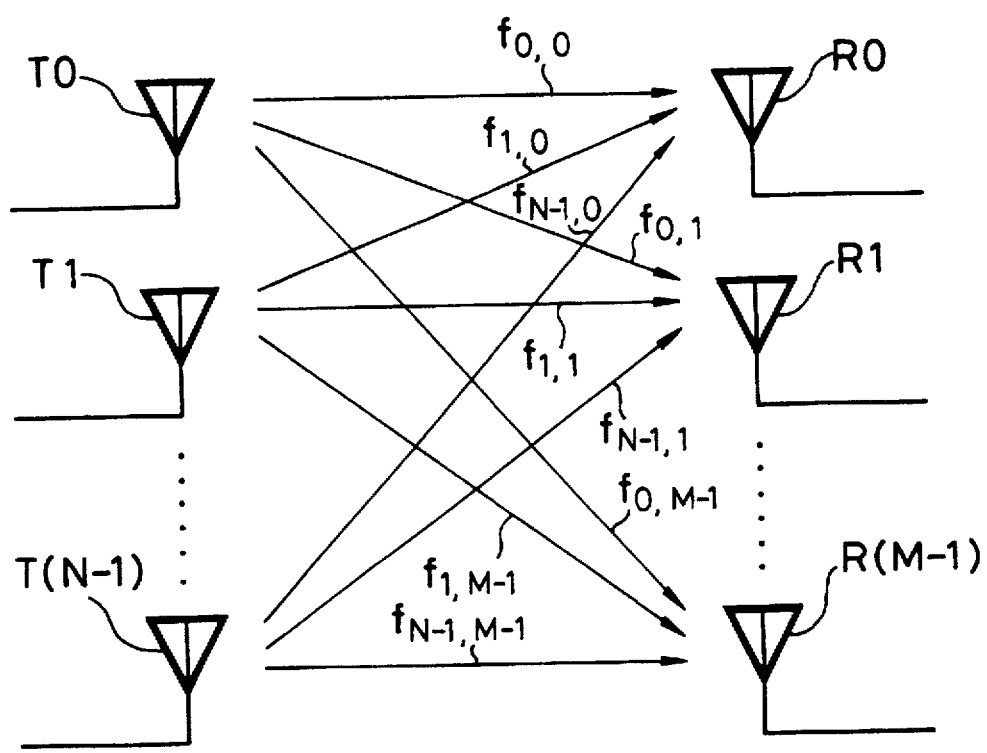
FIG. 11 is a schematic diagram showing a transmission state.

FIG. 11 shows the transmission state obtained when the signal transmitted from the transmission system shown in FIG. 8 is received at the reception system shown in FIG. 10.

As shown in FIG. 11, antennas T0, T1, . . . , T(N-1) [N is an arbitrary integer larger than "2"] are prepared as transmission antennas, for example, and antennas R0, R1, . . . , R(M-1) [M is an arbitrary integer larger than "2"] are prepared as reception antennas. If the transmission at the transmission antennas T0 to T(N-1) is switched at one frame unit, then the reception at the reception antennas R0 to R(M-1) is switched at one frame unit, and the transmission side and the reception side are switched randomly under the condition that they are not associated with each other. (N×M) propagation paths $f_{0,0}, f_{0,1}, \ldots, f_{N-1,M-1}$ exist between the transmitter and the receiver. There is then the large probability that there exists a propagation path through which the transmission signal can be transmitted satisfactorily. Thus, it is possible to improve the transmission characteristic obtained when the transmission signal is transmitted in the presence of fading. The number of the transmission antenna and the number of the reception antenna may not always be the same, and only one of the transmission system and the reception system may include a plurality of antennas. If one of the transmission system and the reception system includes a plurality of antennas, then any one of N or M becomes "1" in the arrangement shown in FIG. 11.

Figure 12:
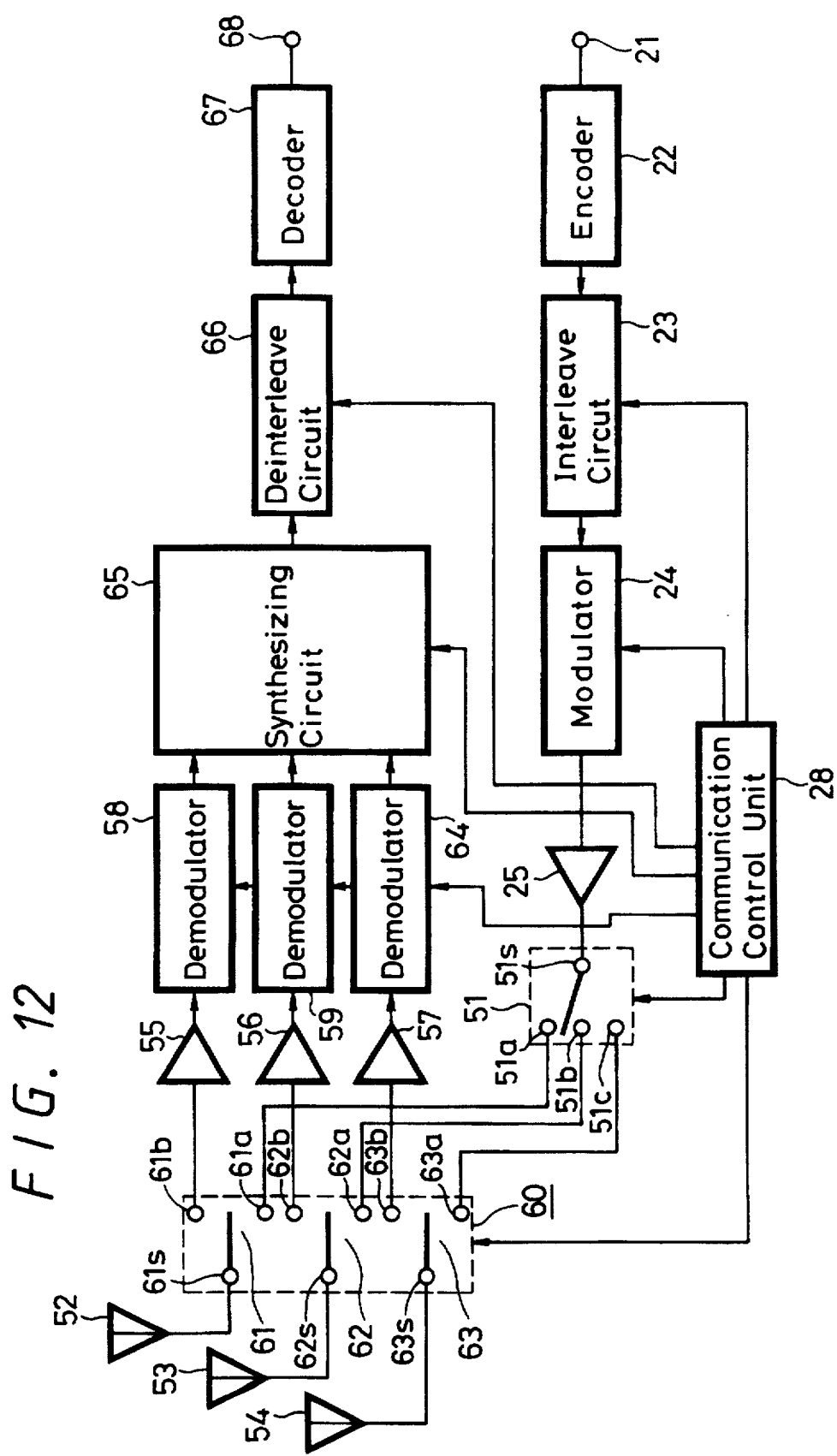
FIG. 12 is a schematic block diagram showing an example of a transmitter-receiver formed of a combination of a transmission circuit according to the present invention and a diversity reception circuit.

FIG. 12 shows, in block form, an example of a transmitter-receiver formed by a combination of the transmission system circuit according to the present invention and a diversity reception circuit. In FIG. 12, like parts corresponding to those of FIG. 8 are marked with the same references, and therefore need not be described in detail.

In the case of FIG. 12, the transmitter-receiver includes three antennas for transmitting and receiving burst data by the TDMA system. Initially, the transmission system will be described below. As shown in FIG. 12, burst transmission output data outputted from the transmission amplifier 25 is supplied to a movable contact 51s of an antenna switcher 51. The antenna switcher 51 switches the transmission output at one burst data unit and supplies the switched transmission output to other antennas. The antenna switcher 51 includes three fixed contacts 51a, 51b, 51c, and switches the movable contact 51s under control of the communication control unit 28 which controls transmission and reception.

The fixed contacts 51a, 51b, 51c of the antenna switcher 51 are connected to one fixed contacts 61a, 62a, 63a of three change-over switches 61, 62, 63 disposed within the antenna switcher 60. The antenna switcher 60 switches the antenna to the transmission system or the reception system during the transmission period and the reception period. The movable contacts 61s, 62s, 63s of the three change-over switches 61, 62, 63 disposed within the antenna switcher 60 are connected to other antennas 52, 53, 54.

The three change-over switches 61, 62, 63 disposed within the antenna switcher 60 connect the movable contacts 61s, 62s, 63s to the fixed contacts 61a, 62a, 63a during the transmission period, and connect the movable contacts 61s, 62s, 63s to the other fixed contacts 61b, 62b, 63b during the reception period under control of the communication control unit 28.

The other fixed contacts 61b, 62b, 63b of the three change-over switches 61, 62, 63 are connected through reception amplifiers 55, 56, 57 to input terminals of demodulators 58, 59, 64, and the demodulators 58, 59, 64 demodulate the reception burst signal, separately. The demodulation processing is carried out under control of the communication control unit 28. Demodulated outputs from the demodulators 58, 59, 64 are supplied to a synthesizing circuit 65. This synthesizing circuit 65 judges the demodulated output with best reception condition from the demodulated outputs of three systems supplied thereto from the demodulators 58, 59, 64 under control of the communication control unit 28, and supplies a judged demodulated output to a deinterleave circuit 66.

The deinterleave circuit 66 deinterleaves the data interleaved on the transmission side. The reception data thus deinterleaved is supplied to a decoder 67, in which it is decoded, and received bit data is developed at an output terminal 68.

With the above arrangement, upon reception, the diversity reception for selecting the data with satisfactory reception condition is carried out by use of the three antennas 52, 53, 54 of this transmitter-receiver. Upon transmission, the three antennas 52, 53, 54 are switched at one burst data unit and used, and hence the transmitter-receiver carries out the transmission as the distribute antenna. Accordingly, the three antennas can be utilized effectively in any one of the reception and the transmission so that satisfactory reception based on the diversity reception and satisfactory transmission based on the distribute antenna transmission can be realized by the simple arrangement with antennas made common.

In the above-mentioned embodiment, data format of one burst data transmitted is not described but various well-known formats can, of course, be applied to the burst data format. Specific transmitter and receiver can be suitably applied to portable radiotelephones and mobile radiotelephones which have a large probability that they are used in a transmission line with fadings. Also, the transmitter and the receiver according to the present invention can be applied to a variety of transmitters and receivers.

While the encoder on the transmission side is the convolutional code encoder for dispersing one-bit data into 15 symbols as described above, the present invention is not limited thereto, and convolutional code processing of other arrangement may be carried out. As long as the coding processing disperses one-bit data into a plurality of symbols, coding processing of other systems may be used. Similarly, while the Viterbi decoding circuit is used as the decoder on the reception side as described above, the present invention is not limited thereto, and other decoding means may be used as long as the decoding means may generate output signals assuming transmission information by synthesizing signals dispersed into a plurality of symbols.

While the antenna is switched at one burst data unit as described above, the present invention is not limited thereto, and at least one burst data may be transmitted or received by the same antenna. Thus, the antenna may be switched at the unit of a plurality of burst data.

According to the transmitter of the present invention, since the antenna for transmitting transmission data at the unit of burst data under the condition that each bit data is dispersed into a plurality of burst data, data can be transmitted from a plurality of antennas in the dispersed state by the simple transmitter arrangement having only the antenna switcher. Therefore, the distribute antenna on the transmission side can be realized by the simple arrangement without delay circuit and distributor.

Since a reception circuit is connected to a plurality of antennas of the transmitter and this reception circuit executes a diversity reception for selecting any one of the signals received at the respective antennas, a satisfactory transfer processing can be carried out by effectively utilizing a plurality of antennas for both transmission and reception.

According to the receiver of the present invention, signals dispersed by a plurality of antennas can be received by the simple arrangement in which the received signals received at a plurality of antennas are switched at the unit of burst data, and hence the distribute antenna on the reception side can be realized by the simple arrangement without delay circuit and distributor.

According to a transmission method of the present invention, each bit data is dispersed into a plurality of burst data and transmitted. Also, data are dispersed and transmitted from a plurality of antennas by switching the transmission antennas at the unit of burst data. Therefore, the distribute antenna transmission processing can be realized by the simple and efficient processing.

Further, according to the reception method of the present invention, the signals received at a plurality of antennas are switched at the unit of burst data, the switched received signal is deinterleaved over a plurality of burst data, and the signals dispersed by a plurality of antennas and received are decoded. Therefore, the distribute antenna reception processing can be realized by the simple and efficient processing.

Furthermore, according to the transfer method of the present invention, the distribute antenna transmission processing can be carried out on the transmission side by the simple and efficient processing, and the distribute antenna reception processing can be carried out on the reception side by the simple and efficient processing. Therefore, there can be obtained a satisfactory transfer characteristic by the simple processing even though the propagation path has fadings.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A radio transmitter for intermittently transmitting an encoded information signal in a form of a burst signal comprising:

an encoder for generating an encoded bit signal by encoding bit data of transmission information;

interleave means for interleaving an output signal from said encoder over a plurality of burst signals;

a modulator for modulating an output signal from said interleave means;

a plurality of antennas; and switch means for sequentially selectively supplying an output signal of said modulator to said plurality of antennas for each of said plurality of burst signals.

2. The radio transmitter as claimed in claim 1, wherein said encoder is a convolutional code encoder.

3. A radio receiver for receiving a signal transmitted from a transmitter including an encoder for generating an encoded bit signal by encoding bit data of transmission information, interleave means for interleaving an output signal from said encoder over a plurality of burst signals, a modulator for modulating an output signal from said interleave means, and switch means for sequentially selectively supplying an output signal from said modulator to a plurality of antennas for each of said plurality of burst signals, comprising:

a plurality of antennas;

switch means for sequentially selecting reception signals received at said plurality of antennas for each of said plurality of burst signals;

a demodulator for demodulating an output signal of said switch means;

deinterleave means for deinterleaving an output signal of said demodulator over said plurality of burst signals; and decoding means for generating an output signal for estimating said transmission information by decoding the encoded bit signal in each of said plurality of burst signals deinterleaved by said deinterleave means.

4. The radio receiver as claimed in claim 3, wherein said encoder is a convolutional code encoder, and said decoding means is a Viterbi decoder.

5. A radio transmission method for intermittently transmitting an encoded information signal in a form of a burst signal, comprising the steps of:

generating an encoded bit signal by encoding bit data of transmission information;

interleaving said encoded bit signal over a plurality of burst signals;

modulating the interleaved signal from the interleaving step; and transmitting the modulated signal from the modulating step by sequentially selectively supplying the modulated signal to a plurality of antennas for each of said plurality of burst signals.

6. The radio transmission method as claimed in claim 5, wherein the bit data of transmission information is encoded by convolutional coding.

7. A radio reception method for receiving a signal transmitted by a radio transmission method comprising the steps of generating an encoded bit signal by encoding bit data of transmission information, interleaving the encoded bit signal over a plurality of burst signals, modulating the interleaved signal, and transmitting a transmission signal by sequentially selectively supplying the modulated signal to a plurality of antennas for each of the plurality of burst signals, comprising the steps of:

sequentially selecting reception signals received at a plurality of antennas at every burst signal;

demodulating the selected signal from the selecting step;

deinterleaving the demodulated signal from the demodulating step over the plurality of burst signals; and generating an output signal assuming transmission information by decoding the encoded bit signal in the plurality of burst signals.

8. The radio reception method according to claim 7, wherein the bit data of transmission information is encoded by convolutional coding, and the encoded bit signal is decoded by Viterbi decoding.

9. A radio transmission-reception method comprising the steps of:

generating an encoded bit signal by encoding bit data of transmission information;

interleaving said encoded bit signal over a plurality of burst signals to produce an interleaved signal;

modulating the interleaved signal to produce a modulated signal;

transmitting a transmission signal by sequentially selectively supplying the modulated signal to a plurality of antennas for each of said plurality of burst signals;

receiving the transmission signal at a plurality of antennas to produce reception signals;

sequentially selecting said reception signals received at said plurality of antennas for each of said plurality of burst signals to produce selected signals;

demodulating the selected signals;

deinterleaving the demodulated signal over said plurality of burst signals to produce deinterleaved burst signals; and generating an output signal for estimating transmission information be decoding the encoded bit signal in the deinterleaved burst signals.

10. A radio transmitter-receiver comprising:

a plurality of antennas;

first switch means including a plurality of first terminals respectively connected to said plurality of antennas, second terminals connected to said first terminals upon transmission, and third terminals connected to said first terminals upon reception;

encoding means for generating an encoded bit signal by encoding bit data of transmission information;

interleave means for interleaving an output signal from said encoding means over a plurality of burst signals;

modulating means for receiving an output signal from said interleave means;

second switch means for sequentially selectively providing an output signal from said modulating means to said second terminals;

a plurality of demodulating means for respectively demodulating signals provided from said third terminals of said first switch means;

synthesizing means for selecting and outputting a best signal from output signals of said demodulating means;

deinterleave means for deinterleaving an output signal from said synthesizing means over said plurality of burst signals to produce deinterleaved burst signals; and decoding means for generating an output signal for estimating transmission information by decoding the encoded bit signal of the deinterleaved burst signals.

* * * * *